United States Patent
Nakamura (10) Patent No.: US 10,109,417 B2
(45) Date of Patent: Oct. 23, 2018

(54) LAMINATED IRON CORE AND METHOD OF MANUFACTURING LAMINATED IRON CORE WITH CAULKING PROTRUSION

(71) Applicant: MITSUI HIGH-TEC, INC., Kitakyushu-shi, Fukuoka (JP)

(72) Inventor: Izumi Nakamura, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 531 days.

(21) Appl. No.: 14/637,753

(22) Filed: Mar. 4, 2015

(65) Prior Publication Data
US 2015/0256036 A1   Sep. 10, 2015

(30) Foreign Application Priority Data
Mar. 10, 2014   (JP) .................. 2014-046470

(51) Int. Cl.
*H02K 1/06*   (2006.01)
*H01F 41/02*   (2006.01)
(Continued)

(52) U.S. Cl.
CPC ....... *H01F 41/0233* (2013.01); *H01F 41/024* (2013.01); *H02K 1/276* (2013.01);
(Continued)

(58) Field of Classification Search
CPC ...... H02K 2201/09; H02K 1/276; H02K 1/06; H02K 1/18; H02K 2213/03; H01F 41/0233; H01F 41/024
(Continued)

(56) References Cited

U.S. PATENT DOCUMENTS 3,862,485 A   1/1975   Hafner
3,885,299 A   5/1975   Hafner
(Continued)

FOREIGN PATENT DOCUMENTS

CN   1742419    3/2006
CN   103035374  4/2013
(Continued)

OTHER PUBLICATIONS

Machine translation of JP 2006025533 A (Jan. 2006).*
(Continued)

*Primary Examiner* — Michael Andrews
(74) *Attorney, Agent, or Firm* — Greenblum & Bernstein, P.L.C.

(57) ABSTRACT

There is provided a laminated iron core including a plurality of piled iron core pieces, each piled iron core pieces being blanked from at least two piled sheet materials and sequentially laminated on other piled iron core pieces, wherein the piled iron core pieces adjacent in a direction of lamination are interlocked together by a plurality of caulking parts provided in each piled iron core pieces. Each of the plurality of caulking parts includes a caulking protrusion formed in one side and a caulking fitting groove formed in the other side to which the caulking protrusion is fitted, and the caulking protrusion is allowed to protrude to the caulking fitting groove of the piled iron core pieces adjacent thereto in the direction of lamination, and a width of the caulking protrusion is larger than an inner width of the caulking fitting groove.

13 Claims, 8 Drawing Sheets

(51) Int. Cl.
*H02K 1/27* (2006.01)
*H02K 15/03* (2006.01)

(52) U.S. Cl.
CPC ......... *H02K 15/03* (2013.01); *H02K 2201/09* (2013.01); *H02K 2213/03* (2013.01); *Y10T 29/49078* (2015.01)

(58) Field of Classification Search
USPC .................................. 310/216.048, 216.004
See application file for complete search history.

(56) References Cited

U.S. PATENT DOCUMENTS

| | | | |
|---|---|---|---|
| 3,924,378 | A | 12/1975 | Hafner |
| 3,934,327 | A | 1/1976 | Hafner |
| 3,981,064 | A | 9/1976 | Hafner |
| RE31,737 | E | 11/1984 | Hafner |
| 7,352,101 | B2 | 4/2008 | Fujita |
| 9,318,923 | B2 | 4/2016 | Nagai et al. |
| 2005/0077798 | A1* | 4/2005 | Mitsui ................. H02K 1/02 310/216.004 |
| 2006/0108891 | A1 | 5/2006 | Fujita |
| 2008/0282530 | A1* | 11/2008 | Bertocchi ......... H01F 41/0233 310/402 |
| 2012/0126658 | A1* | 5/2012 | Sanji .................. H02K 1/276 310/216.009 |
| 2013/0249346 | A1 | 9/2013 | Nagai et al. |

FOREIGN PATENT DOCUMENTS

| | | | | |
|---|---|---|---|---|
| CN | 103339828 | | 10/2013 | |
| JP | 53-21551 | | 7/1978 | |
| JP | 55-156623 | | 12/1980 | |
| JP | 57-95045 | | 12/1980 | |
| JP | 56-59539 | | 5/1981 | |
| JP | 57-156657 | | 9/1982 | |
| JP | 61-249635 | | 11/1986 | |
| JP | 62-259628 | | 11/1987 | |
| JP | 2-264411 | | 10/1990 | |
| JP | 5-76963 | | 3/1993 | |
| JP | 7-322536 | | 12/1995 | |
| JP | 8-300061 | | 11/1996 | |
| JP | 8-340659 | | 12/1996 | |
| JP | 10-85856 | | 4/1998 | |
| JP | 10085856 | A * | 4/1998 | .......... B21D 39/031 |
| JP | 2003-219585 | | 7/2003 | |
| JP | 2005-348456 | | 12/2005 | |
| JP | 2006-025533 | | 1/2006 | |
| JP | 2006025533 | A * | 1/2006 | ............... H02K 1/18 |
| JP | 2008-029169 | | 2/2008 | |

OTHER PUBLICATIONS

Machine translation of JP 10085856 A (Apr. 1998).*
Office Action issued in China Counterpart Patent Appl. No. 201510105383.3, dated Dec. 28, 2016, along with an English translation thereof.
Xinqun Zhang, "Stamping Process and Die Design", Beijing China Railway Publishing House, Dec. 2012, pp. 33-37.
Office Action issued in Japan Counterpart Patent Appl. No. 2014-046470, dated Nov. 7, 2017, along with an English translation thereof.
Japanese Office Action received in JP 2014-046470, dated Jun. 12, 2018, and English language translation thereof.

* cited by examiner

LAMINATED IRON CORE AND METHOD OF MANUFACTURING LAMINATED IRON CORE WITH CAULKING PROTRUSION

CROSS REFERENCE TO RELATED APPLICATIONS

This application is based upon and claims the benefit of priority of Japanese Patent Application No. 2014-046470 filed on Mar. 10, 2014, the contents of which are incorporated herein by reference in its entirety.

BACKGROUND OF THE INVENTION

1. Field of the Invention

The present invention relates to a laminated iron core of a stator or a rotor which forms an electric motor and a manufacturing method for the laminated iron core.

2. Description of the Related Art

Figure 7:
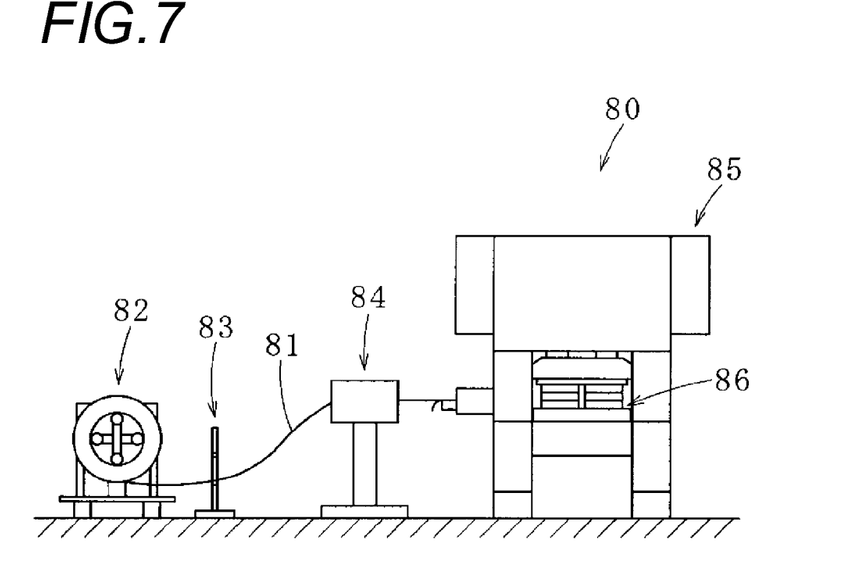
FIG. 7 is an explanatory view of a press line which manufactures a laminated iron core.

An iron core (a laminated iron core) of a stator or a rotor which forms an electric motor is manufactured in such a manner that, for instance, a press line 80 shown in FIG. 7 is used to blank or stamp out a thin electromagnetic steel plate (a sheet material) 81 to form a prescribed configuration, and the prescribed number of blanked or stamped iron core pieces are laminated and interlocked together by a caulking or welding unit. FIG. 7 indicates an un-coiler 82 which rewinds the electromagnetic steel plate 81, a sensor 83 which detects a looseness of the rewound electromagnetic steel plate 81, a leveler 84 which removes a distortion of the electromagnetic steel plate 81, and a press 85 provided with a progressive feed die 86 which blanks or stamps the iron core piece.

Figure 8A:
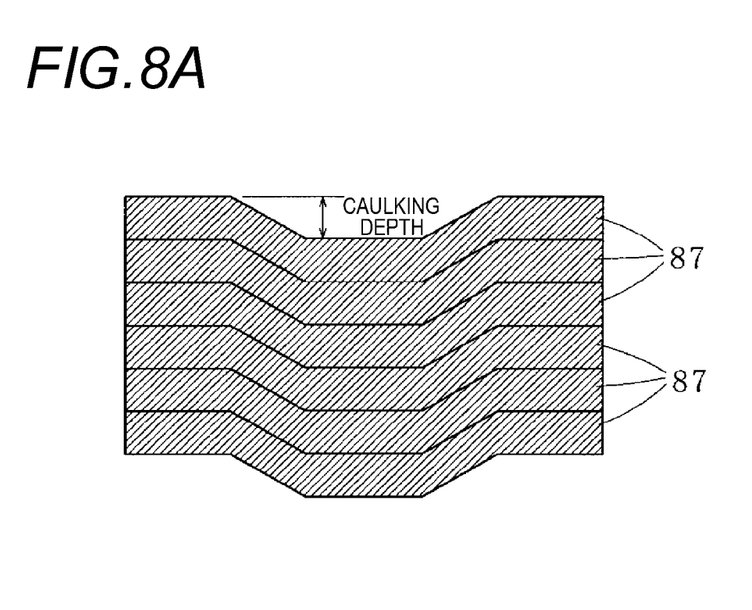
FIG. 8A is a partly front sectional view of a caulking part of a laminated iron core formed in such a way that one iron core pieces are sequentially caulked and laminated.

Here, as shown in FIG. 8A, when a caulking part is used as a interlocking unit of the laminated iron core pieces 87, a depth of the caulking part is an important manufacturing condition in order to obtain a prescribed interlocking force.

In recent years, iron cores which use a thinner electromagnetic steel plate increase in order to improve a performance of the electric motor. However, since as the thickness of the electromagnetic steel plate is smaller, the number of blanked iron core pieces is the more increased to laminate the iron core pieces in a prescribed thickness. Accordingly, when the usual manufacturing method is used that the iron core pieces are blanked or stamped one piece by one piece, as the thickness of the electromagnetic steel plate is more decreased, the productivity of the iron core pieces is the more deteriorated.

As a countermeasure thereof, there is a method that a plurality of electromagnetic steel plates is piled and the piled electromagnetic steel plates are blanked or stamped at the same time. Thus, the productivity is increased integer times as large as that when the iron core pieces are blanked or stamped out one piece by one piece (for instance, two times when the two electromagnetic steel plates are piled), so that the productivity can be prevented from being deteriorated due to the reduced thickness of the plate (for instance, see JP-A-2003-219585).

SUMMARY OF THE INVENTION

For instance, it is assumed that the iron core pieces which are blanked or stamped from the two piled electromagnetic steel plates are sequentially laminated two pieces at a time, and a caulking part is used as an interlocking unit. Even in this case, a depth of the caulking part also gives a great influence to the interlocking force like a case that the above-described iron core pieces are sequentially laminated one piece at a time.

Here, as shown in FIG. 8A, when the iron core pieces 87 are sequentially laminated one piece at a time, if the depth of the caulking part is substantially the same as the thickness of the one electromagnetic steel plate (the iron core piece 87), an interlocking operation can be sufficiently carried out by the caulking part. When the electromagnetic steel plate having the thickness of, for instance, 0.3 mm, is used, if the depth of the caulking part formed in the iron core piece is set to 0.3 mm equal to the thickness of the plate, the interlocking operation of the iron core pieces by the caulking part can be carried out.

Figure 8B:
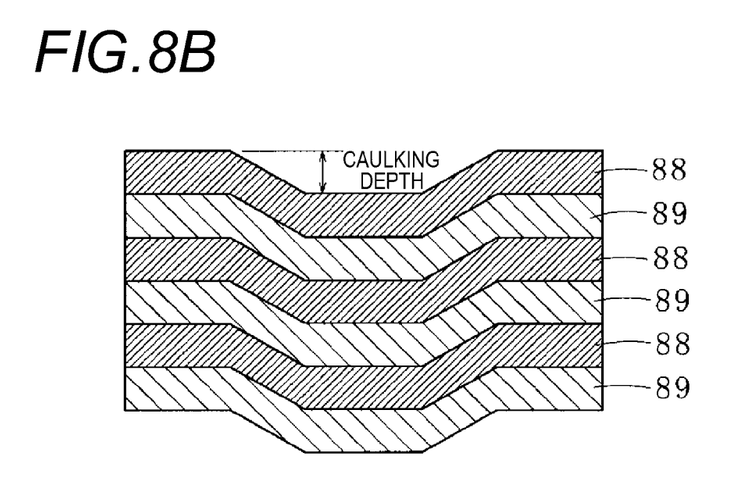
FIG. 8B is a partly front sectional view of a caulking part of a laminated iron core according to a usual example formed in such a way that piled iron core pieces are sequentially caulked and laminated.

However, as shown in FIG. 8B, when two piled iron core pieces 88 and 89 are taken as one set and sequentially laminated, even if the depth of the caulking part is set to 0.3 mm as the thickness of the one electromagnetic steel plate (the iron core piece 88), the interlocking operation by the caulking part cannot be carried out. Otherwise, even when the interlocking operation can be carried out, the interlocking force which is practically required cannot be obtained.

Further, in order to interlock the two iron core pieces 88 and 89 adjacent in a direction of lamination, a welding or an adhesive agent may be supposed to be used. In this case, however, a process that a welding work is carried out or the adhesive agent is applied needs to be newly provided. Thus, productivity is caused to be deteriorated and an investment of equipments is necessary to increase a cost.

The present invention is devised partly by considering the above-described circumstances and it is a non-limited object of the present invention to provide a laminated iron core and a manufacturing method for the laminated iron core in which even when piled iron core pieces are blanked or stamped from piled sheet materials and the blanked iron core pieces are sequentially laminated as a measure for an improvement of a productivity, the iron core pieces can be interlocked together by caulking by the use of an existing equipment and an interlocking force which is practically required can be obtained.

A first aspect of the present invention provides a laminated iron core including: a plurality of piled iron core pieces, each piled iron core pieces being blanked from at least two piled sheet materials and sequentially laminated on other piled iron core pieces, wherein the piled iron core pieces adjacent in a direction of lamination are interlocked together by a plurality of caulking parts provided in each piled iron core pieces, wherein each of the plurality of caulking parts includes a caulking protrusion formed in one side and a caulking fitting groove formed in the other side to which the caulking protrusion is fitted, and the caulking protrusion is allowed to protrude to the caulking fitting groove of the piled iron core pieces adjacent thereto in the direction of lamination, and a width of the caulking protrusion is larger than an inner width of the caulking fitting groove.

The laminated iron core may be configured so that the caulking part has a V-shape and both sides of the caulking protrusion in a direction of width are separated from a body of the iron core piece.

The laminated iron core may be configured so that a protruding width of the caulking protrusion with respect to the caulking fitting groove in plan view is set within a range of 2% or higher and 6% or lower as thick as a thickness of one sheet material.

The laminated iron core may be configured so that the protruding width of the caulking protrusion is defined by the following expression: (the width of the caulking protrusion–the inner width of the caulking fitting groove)/2.

The laminated iron core may be configured so that a depth of the caulking fitting groove is two times or more as thick as a thickness of the one sheet material.

The laminated iron core may be configured so that each piled iron core pieces have at least two iron core pieces different in thickness, and a depth of the caulking fitting groove is two times or more as thick as an average thickness of the at least two piled sheet materials.

The laminated iron core may be configured so that a sheared surface and a broken surface are formed in a side surface of the iron core piece of the piled iron core pieces located in an upper side, and a broken surface is formed in a side surface of the iron core piece of the piled iron core pieces located in a lower side.

A second aspect of the present invention provides a manufacturing method for a laminated iron core, the manufacturing method including: forming a plurality of caulking parts in at least two piled sheet materials; and blanking piled iron core pieces from the at least two piled sheet materials having the plurality of caulking parts formed and sequentially laminating the piled iron core pieces on other piled iron core pieces, wherein forming the plurality of caulking parts includes using a caulking part forming unit which has a die arranged to be fixed in a given position and a punch paired with the die, wherein an inner width of the die is larger than a width of the punch, to thereby form a caulking protrusion in one side of the piled sheet materials and a caulking fitting groove to which the caulking protrusion is fitted in the other side, wherein a width of the caulking protrusion is larger than an inner width of the caulking fitting groove.

The manufacturing method for the laminated iron core may be configured so that a clearance between the inner width of the die and the punch is set within a range of 2% or higher and 6% or lower as thick as a thickness of one sheet material.

The manufacturing method for the laminated iron core may be configured so that a pressing operation is carried out by the punch until a depth of the caulking fitting groove is two times or more as thick as a thickness of the one sheet material.

In the laminated iron core and the manufacturing method for the laminated iron core according to the aspects of the present invention, in piled iron core pieces which are blanked from piled sheet materials, a caulking part is formed in which a caulking protrusion is formed in one side and a caulking recessed groove is formed in the other side, the caulking protrusion is allowed to protrude to the caulking recessed groove (the one side of the piled sheet materials) of the piled iron core pieces adjacent to each other in the direction of lamination, and a width of the caulking protrusion is formed to be larger than an inner width of the caulking recessed groove. Thus, even when the piled iron core pieces are blanked or stamped and sequentially laminated as a measure for an improvement of the productivity, the interlocking operation by the caulking part can be carried out by using the existing equipment and the interlocking force which is practically necessary can be obtained.

DETAILED DESCRIPTION OF THE EXEMPLARY EMBODIMENTS

Subsequently, by referring to the accompanying drawings, an exemplary embodiment which embodies the present invention will be described to understand the present invention.

As shown in FIGS. 1A and 1B, FIG. 2 and FIG. 3, a laminated iron core 10 according to one exemplary embodiment of the present invention is formed in such a way that a pair of iron core pieces 13 and 14 (a structure of piled iron core pieces) which are blanked or stamped from two piled sheet materials (sheet materials formed with an electromagnetic steel plate) 11 and 12 are taken as one set, the pair of iron core pieces 13 and 14 are sequentially laminated on another pair of iron core pieces 13 and 14, and the paired iron core pieces 13 and 14 which are adjacent in a direction of lamination are interlocked by a plurality of caulking parts 15 provided in each paired iron core pieces 13 and 14. The laminated iron core 10 will be described below in detail.

The laminated iron core 10 may be a laminated iron core of a rotor or a laminated iron core of a stator.

The laminated iron core 10 is formed by sequentially laminating pairs of annular (or disk shaped) iron core pieces 13 and 14. The iron core pieces 13 and 14 respectively have integral structures which have no separate connecting parts in circumferential directions. However, a division structure may be used in which circular arc shaped iron core piece parts can be connected each other in an annular shape (or a disk shape).

Further, a thickness T of the iron core piece 13 and the iron core piece 14 which respectively form the laminated iron core 10 is set to, for instance, about 0.25 to 0.5 mm. The thickness T of the paired iron core piece 13 and the iron core piece 14 is the same, but the thickness may be different within the above-described range.

The paired iron core pieces 13 and 14 which are adjacent in the direction of lamination are connected to each other by the plurality of caulking parts 15 formed at prescribed pitches in the circumferential directions of the iron core pieces 13 and 14.

The caulking part 15 is a V-shaped caulking part having a square (here, a rectangular) in plan view which has a caulking protrusion 16 formed in a lower side (one side) and a caulking fitting groove 17 formed in an upper side (the other side) to which the caulking protrusion 16 is fitted.

Figure 1A:
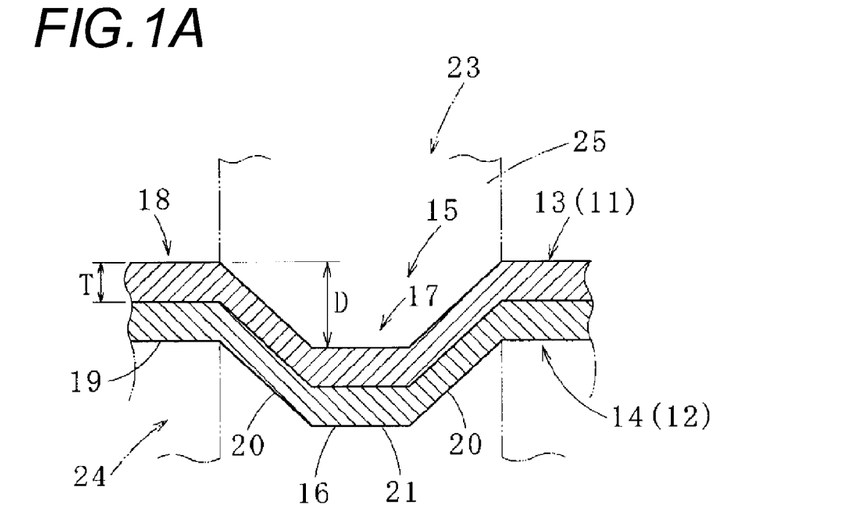
FIG. 1A is a partly front sectional view of a caulking part of piled iron core pieces of a laminated iron core according to one exemplary embodiment of the present invention.

Specifically, as shown in FIG. 1A, the caulking protrusion 16 includes paired inclined parts 20 which are connected to paired iron core piece bodies 18 except the caulking part 15 and protrude downward from lower surfaces 19 of the iron core piece bodies 18 and a bottom part 21 which is connected to end parts of the two inclined parts 20 and substantially parallel to the lower surfaces 19 of the iron core piece bodies 18. A size of the rectangular caulking part 15 has, for instance, a length of 3 to 10 mm or so and a width of 0.5 to 5 mm or so.

Figure 1B:
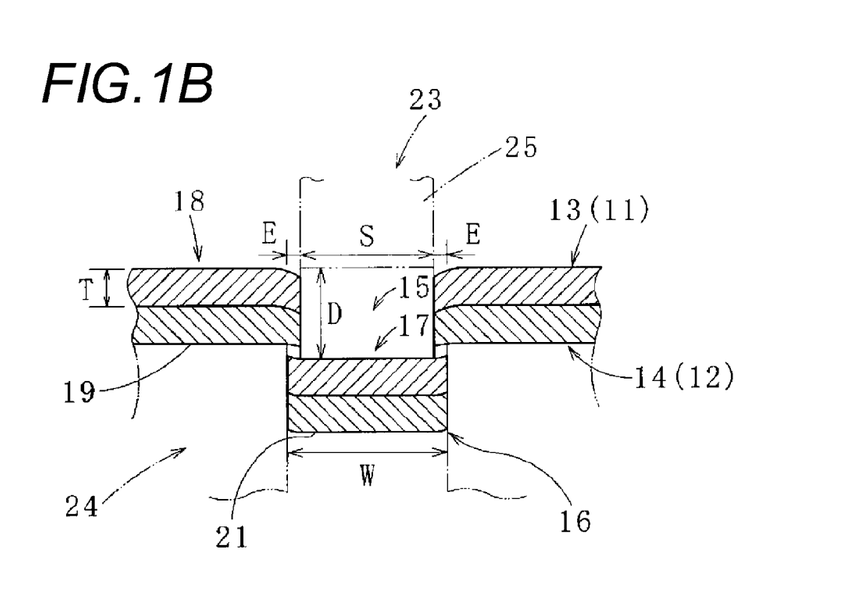
FIG. 1B is a partly side sectional view of the caulking part of the laminated iron core.

Further, as shown in FIG. 1B, both sides of the caulking protrusion 16 (at least, the bottom part 21) in the direction of width are separated (cut) from the iron core piece main bodies 18.

Figure 2:
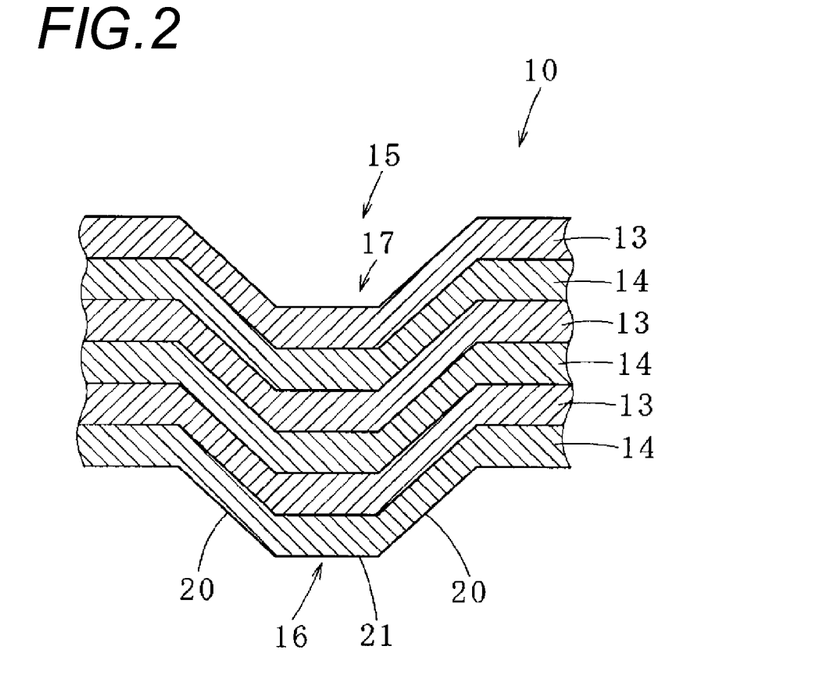
FIG. 2 is a partly front sectional view of the caulking part of the laminated iron core.

The above-described caulking protrusion 16 protrudes, as shown in FIG. 1A and FIG. 2, with respect to the caulking fitting groove 17 of the paired iron core pieces 13 and 14 which are adjacent to each other in the direction of lamination. As shown in FIG. 1B, a width W of the caulking protrusion 16 is set to be larger than an inner width S of the caulking fitting groove 17. A protruding width E of the caulking protrusion 16 to the caulking fitting groove 17 when the caulking part 15 is seen in plan view is a little exaggeratedly illustrated in FIG. 1B.

Specifically, a depth D of the caulking fitting groove 17 is set to be two times or more as thick as the thickness T of one sheet material 11 (the iron core piece 13, the same applies hereinafter). Further, the protruding width E of the caulking protrusion 16 is set within a range of 2% or higher and 6% or lower as thick as the thickness T of the one sheet material 11. The protruding width E of the caulking protrusion 16 is expressed by {(the width W of the caulking protrusion 16)−(the inner width S of the caulking fitting groove 17)}/2.

As for the thickness T of the above-described one sheet material 11, when the thicknesses of the sheet material 11 and the sheet material 12 are the same, the thickness of the one sheet material 11 (or the sheet material 12) is used. However, when the thicknesses of the sheet material 11 and the sheet material 12 are different, an average thickness of the sheet material 11 and the sheet material 12 may be used (the same applies hereinafter).

Here, when the depth D of the caulking fitting groove is smaller than two times as thick as the thickness T, there is a fear that a sufficient depth cannot be obtained and an amount of protrusion of the caulking protrusion is reduced, so that a satisfactory interlocking force (for instance, 20N or higher, the same applies hereinafter) by the caulking part of the paired iron core pieces cannot be obtained.

When the depth D of the caulking fitting groove is two times or more as thick as the thickness T, since the sufficient interlocking force can be obtained by the caulking part, an upper limit value is not especially prescribed. However, if a fact is considered that when the caulking protrusion is formed, the inclined parts are stretched so that gaps are formed between the inclined parts adjacent in the direction of lamination to deteriorate an electric property, the upper limit value is set to, for instance, about four times, or alternatively, about three times.

Accordingly, the depth D of the caulking fitting groove 17 is preferably set to a depth two times or more as thick as the thickness T of the one sheet material 11 (one time or more as thick as all the thickness of the piled sheet materials 11 and 12), and further preferably set to a depth 2.5 times or more.

Further, when the protruding width E of the caulking protrusion 16 is smaller than 2% as thick as the thickness T, there is a fear that the protruding width is reduced, so that the sufficient interlocking force by the caulking part of the paired iron core pieces cannot be obtained.

On the other hand, when the protruding width E of the caulking protrusion exceeds 6% as thick as the thickness T, since a pressing force is increased when the caulking part is formed, there is a fear that the bottom part of the caulking protrusion may not come into contact with a bottom part of the caulking fitting groove which is adjacent thereto in the direction of lamination, gaps may be formed between the caulking parts adjacent in the direction of lamination or a periphery of the caulking fitting groove may swell so that the iron core pieces are laminated under a state that the iron core pieces are inclined.

Accordingly, the protruding width E of the caulking protrusion 16 to the caulking fitting groove 17 in plan view is preferably set within a range of 2% or higher and 6% or lower as thick as the thickness T of the one sheet material 11 (i.e., 1% or higher and 3% or lower as thick as all the thickness of the piled sheet materials 11 and 12). A lower limit is preferably set to 3% and more preferably set to 4%. As the thickness T of the sheet material is larger, the interlocking force by the caulking part is improved even when the protruding width E of the caulking protrusion 16 is small. Accordingly, as the thickness T of the sheet material is more increased, the protruding width E of the caulking protrusion 16 may be more reduced.

On a side surface (a peripheral surface) of the iron core piece 13 located in the upper side (blanked or stamped first) of the above-described paired iron core pieces 13 and 14 which are blanked or stamped out in a state where they are piled, a sheared surface and a broken surface are formed. On a side surface (a peripheral surface) of the iron core piece 14 located in the lower side (blanked or stamped later), a broken surface is formed.

Thus, the iron core piece 13 which is blanked first can be discriminated from the iron core piece 14 which is blanked later.

However, when blanking conditions of the paired iron core pieces (for instance, a blanking speed or clearance or the like) are variously changed, a ratio of the above-described sheared surface to the broken surface can be changed.

Subsequently, a manufacturing method for the laminated iron core 10 according to the one exemplary embodiment of the present invention will be described below by referring to FIG. 1A to FIG. 4.

Figure 3:
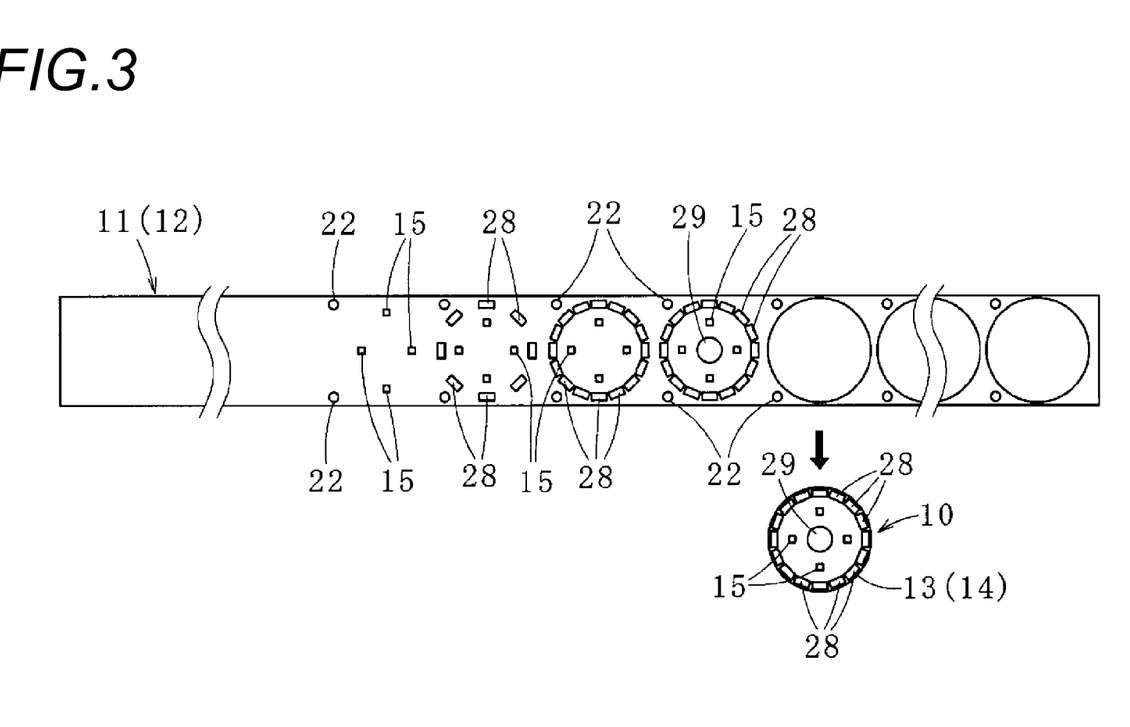
FIG. 3 is an explanatory view of a manufacturing method of the laminated iron core.

Initially, as shown in FIG. 3, the two sheet materials (the sheet materials formed with the electromagnetic steel plate) 11 and 12 having the thickness of, for instance, 0.25 to 0.5 mm or so are arranged to be superposed or piled one upon another.

Here, the two sheet materials 11 and 12 are merely superposed one upon another, but the two sheet materials may be previously interlocked by the caulking part or welded as required.

Then, the plurality of caulking parts 15 are formed in the above-described two sheet materials 11 and 12 which are piled. Here, at both sides of the sheet materials 11 and 12 in the direction of width, positioning pilot holes 22 are formed at prescribed pitches. As for a first iron core piece of the paired iron core pieces in order of lamination, the caulking parts 15 are not formed, but caulking holes are formed (through holes) to which the caulking parts 15 are fitted.

When the caulking parts 15 are formed, a caulking part forming unit 23 shown in FIG. 4 is used.

The caulking part forming unit 23 includes a die 24 for caulking part forming which is arranged to be fixed in a given position and a punch 25 paired with the die 24 to form the caulking part 15 (a V-shaped caulking part) in the piled sheet materials 11 and 12. Specifically, a through hole 26 having a square form in section (here, a rectangular form in section) is formed in the die 24. The punch 25 has a square form in section (here, a rectangular form in section) so as to correspond to the through hole 26 of the die 24. Angular parts in both sides of an end part of the punch 25 in a longitudinal direction are chamfered to form oblique side parts 27. A stripper plate which presses the sheet materials 11 and 12 is not shown in the drawing.

Figure 4A:
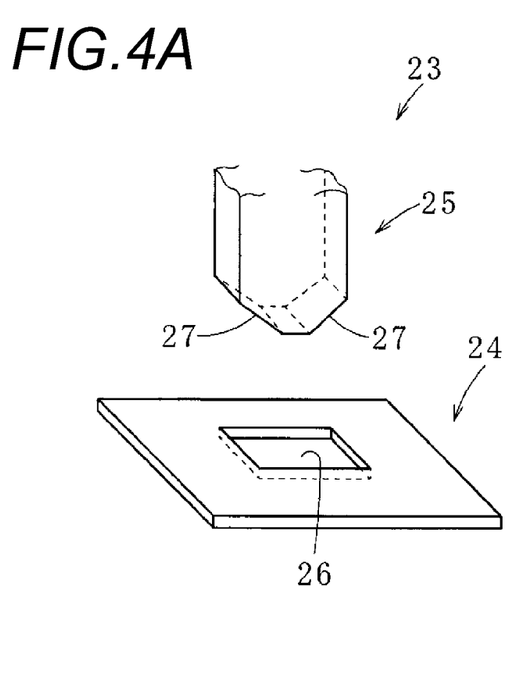
FIG. 4A is a perspective view of a caulking part forming unit used for the manufacturing method for the laminated iron core.

To both the ends of the punch 25 in the longitudinal direction which is seen in plan view, some clearances are set so that the punch 25 may be inserted into the through hole 26 of the die 24 (substantially, none) as shown in FIG. 1A and FIG. 4A.

The oblique side parts 27 provided in both the sides of the end part of the punch 25 in the longitudinal direction are formed in such a way that the caulking protrusion 16 protrudes to a lower side of the piled sheet materials 11 and 12 when the punch 25 is pressed to the two sheet materials 11 and 12 as shown in FIGS. 1A and 1B and FIG. 2. Specifically, the oblique side parts 27 are formed in such a way that the caulking protrusion 16 protrudes to the caulking fitting groove 17 of the paired iron core pieces 13 and 14 which are adjacent to each other in the direction of lamination, namely, the depth D of the caulking fitting groove 17 is two times or more as thick as the thickness T of the one sheet material 11.

Thus, when the punch 25 is pressed to the two sheet materials 11 and 12 which are arranged to be superposed one upon another, the depth D of the caulking fitting groove 17 can be set to two times or more as thick as the thickness T of the one sheet material.

Figure 4B:
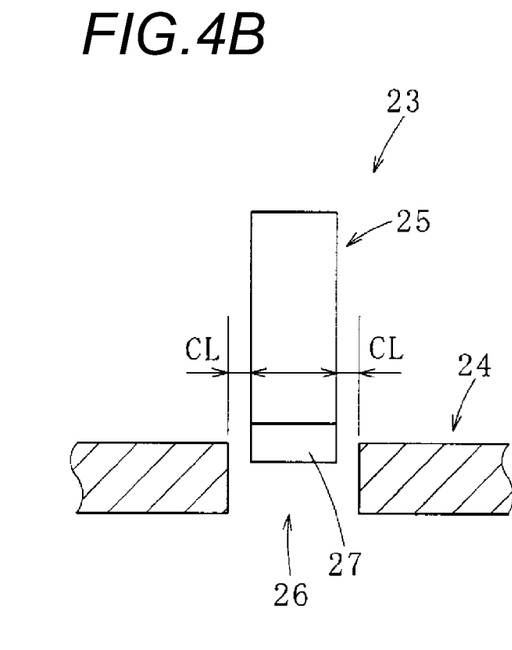
FIG. 4B is a partly side sectional view of the caulking part forming unit.

Further, as for a width of the punch 25, as shown in FIG. 1B, FIG. 4A and FIG. 4B, an inner width of the die 24 is set to be larger than the width of the punch 25 so that the caulking part 15 may be formed in which the width W of the caulking protrusion 16 is set to be larger than the inner width S of the caulking fitting groove 17. Specifically, a clearance CL between the inner width of the die 24 and the punch 25 is set within a range of 2% or higher and 6% or lower as thick as the thickness T of the one sheet material 11.

The above-described range of the clearance CL between the inner width of the die 24 and the punch 25 is set based on the description that the protruding width E of the caulking protrusion 16 to the caulking fitting groove 17, which are seen in plan view, is set within a range of 2% or higher and 6% or lower as thick as the thickness T of the one sheet 11.

The above-described caulking part 15 also has a function for interlocking the two sheet materials 11 and 12 which are arrange to be superposed one upon another (a caulking part forming process as described above).

Then, the paired iron core pieces 13 and 14 are blanked or stamped to form desired forms from the sheet materials 11 and 12 in which the caulking part 15 is formed. FIG. 3 shows blanking states of the iron core pieces used for the laminated iron core of the rotor, which are substantially the same as those of the iron core pieces used for the laminated iron core of the stator except that the blanked forms are different.

Initially, a plurality of insert holes 28 for permanent magnets are formed in the circumferential direction.

Subsequently, a shaft hole 29 is formed at a position of an axis of the plurality of formed insert holes 28.

Then, the paired iron core pieces 13 and 14 are blanked or stamped from the sheet materials 11 and 12 which are piled and the pairs of blanked iron core pieces 11 and 12 are taken as one sets and sequentially laminated until a previously set thickness is obtained. Thus, the laminated iron core 10 is manufactured (a blanking and laminating process as described above).

When the sheet materials 11 and 12 which are piled are sequentially conveyed in the above-described caulking part forming process and the blanking and laminating process, since the sheet materials 11 and 12 are conveyed in a state where the sheet materials are lifted up, the caulking parts 15 do not interfere with the conveyance.

The permanent magnets which are respectively smaller in section than the insert holes 28 and are not magnetized are inserted into the insert holes 28 of the laminated iron core 10 obtained by the above-described method. Further, the insert holes 28 are filled with a liquid resin to harden the resin and fix the permanent magnets in the insert holes 28. Into the insert holes 28 respectively, the magnetized permanent magnets may be inserted.

In order to use the above-described laminated iron core 10, the permanent magnets are magnetized and a shaft is inserted into the shaft hole 29 of the laminated iron core 10 (an assembling process as described above).

Example

Now, an example will be described which is carried out to recognize an operational effect of the present invention.

Figure 5A:
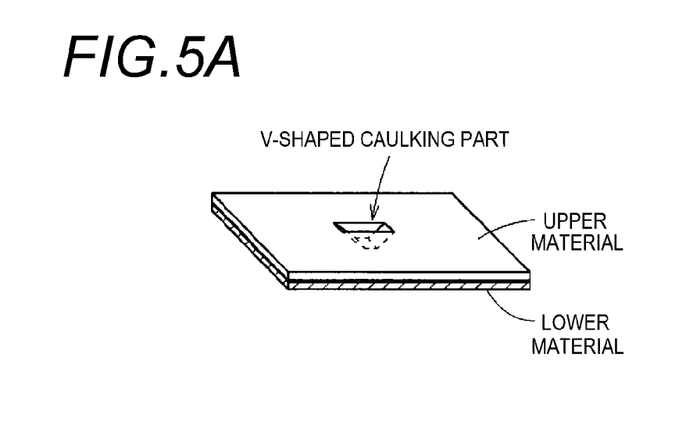
FIG. 5A is a perspective view of two electromagnetic steel plates interlocked by the caulking part.

Initially, after the two electromagnetic steel plates (an upper material and a lower material) used for the iron core forming the electric motor are superposed one upon another, as shown in FIG. 5A, the V-shaped caulking part is formed. Thus, the two electromagnetic steel plates are interlocked together. The V-shaped caulking part is rectangular (1 mm×4 mm) in plan view.

The thickness of the electromagnetic steel plate is set to three levels of 0.25 mm, 0.35 mm and 0.5 mm. The depth of the caulking part is changed between 1.6 times to 2.4 times as thick as the thickness of the one electromagnetic steel plate. The clearance between the punch and the die is set to three levels of 0.005 mm, 0.010 mm and 0.015 mm.

Figure 5B:
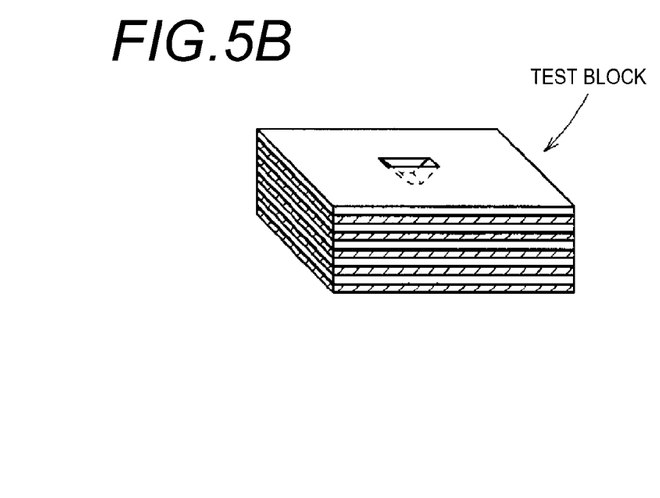
FIG. 5B is a perspective view of a test block formed in such a way that the paired electromagnetic steel plates are caulked and laminated.

The above-described two electromagnetic steel plates are taken as the one set and the paired electromagnetic steel plates are caulked and laminated by using the above-described caulking part forming unit 23 to manufacture a test block which has a thickness of lamination about ten times as thick as the thickness of the one electromagnetic steel plate as shown in FIG. 5B.

Figure 5C:
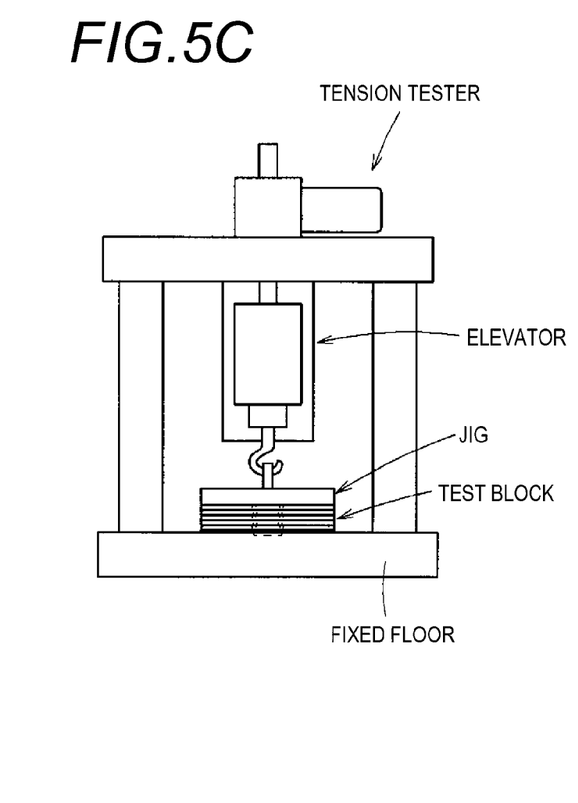
FIG. 5C is an explanatory view of a tension tester using the test block.

The test block is installed on a tension tester shown in FIG. 5C to measure the interlocking force of the caulking part. Specifically, the test block is fixed to a fixed floor of the tension tester and a lower surface of a jig is stuck to an upper surface of the test block by a double sided tape and the jig is lifted in a vertical direction by an elevator. Thus, a tension load when the caulking and interlocking part of the test block is separated is taken as the interlocking force of the caulking part.

Figure 6A:
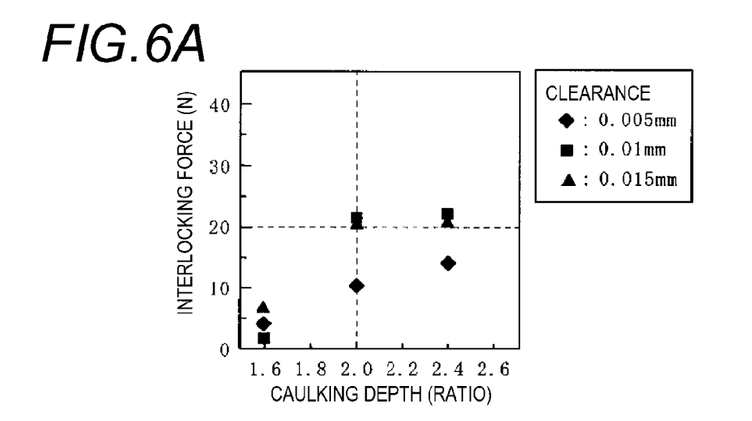
FIGS. 6A to 6C are graphs respectively showing influences of clearances of the caulking part forming unit and caulking depths of a caulking part applied to an interlocking force of the caulking part.
Figure 6B:
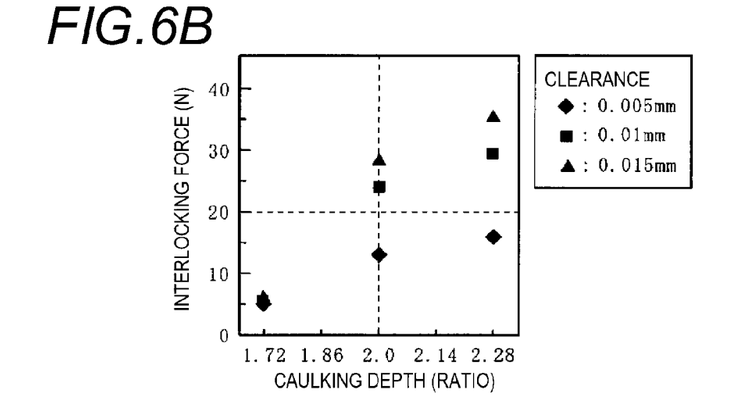
Figure 6C:
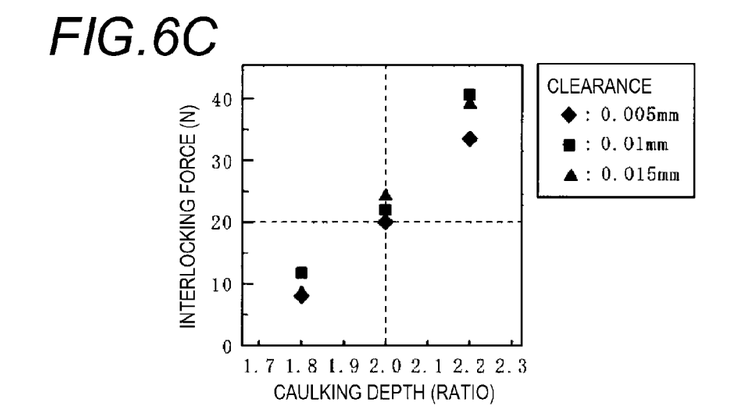

Here, the interlocking force obtained by the tension test of the test block is shown in FIGS. 6A to 6C.

FIGS. 6A to 6C respectively show results when the thickness of the electromagnetic steel plate is 0.25 mm, 0.35 mm and 0.5 mm. An axis of abscissas in FIGS. 6A to 6C shows the depth (ratio) of the caulking part to the thickness of the one electromagnetic steel plate. For instance, 2.0 in the axis of abscissas in FIG. 6A shows that, since the depth of the caulking part corresponds to two times as thick as the thickness (0.25 mm) of the one electromagnetic steel plate, the depth of the caulking part is 0.5 mm.

Further, when the interlocking force is 20N or higher, the test block is strongly interlocked by the caulking part and is not separated by handling. Thus, from a rule of thumb, an evaluation was based on 20N as a reference.

In any of cases of FIGS. 6A to 6C, it was recognized that as the depth of the caulking part was larger, and as the clearance (the protruding width of the caulking protrusion) between the die (the inner width of the die) and the punch was more increased, the interlocking force was the more improved.

Especially, when the two electromagnetic steel plates having the thickness ranging from 0.25 mm to 0.5 mm were piled and they were interlocked by the V-shaped caulking part and laminated, if the depth of the caulking part was set to two times or more as thick as the thickness of the steel plate and the clearance in a caulking work was set to 0.01 mm to 0.015 mm, it was recognized that the interlocking force of 20 N or higher could be obtained and an interlocking operation could be carried out.

As described above, when the laminated iron core and the manufacturing method for the laminated iron core are used, even if the iron core pieces are blanked or stamped from the piled sheet materials and the blanked iron core pieces are sequentially laminated as a measure for the improvement of a productivity, it can be recognized that the iron core pieces can be interlocked together by caulking by the use of the existing equipment and the interlocking force which is practically required can be obtained.

The present invention is described above by referring to the exemplary embodiment. It is to be understood that the present invention is not limited to the composition shown in the above-described exemplary embodiment and other exemplary embodiments or modified examples considered within a range of matters described in claims. For instance, when a part or all of the exemplary embodiments or the modified examples are respectively combined together to form the laminated iron core and the manufacturing method for the laminated iron core of the present invention, they are also included in the right and scope of the present invention.

In the above-described exemplary embodiment, the case is described that the paired iron core pieces are blanked or stamped in a state where they are superposed one upon another from the two piled sheet materials. However, the iron core pieces may be blanked or stamped in a state where they are piled from a plurality of sheet materials, for instance, three or more piled sheet materials and the piled iron core pieces may be sequentially laminated.

Further, in the above-described exemplary embodiment, the V-shaped caulking part is described as the caulking part. The caulking part is not limited to the shape of the V-shaped caulking part. For instance, a caulking part having a U shape in section may be used.

In the above-described exemplary embodiment, the case is described that the paired iron core pieces are interlocked together only by the plurality of caulking parts, but either a welding or a resin may be used or both of them may be used at the same time. As for the resin, a thermosetting resin (for instance, epoxy resin) may be used and a thermoplastic resin may be used.

What is claimed is:

1. A laminated iron core comprising:
a plurality of piled iron core pieces, each of the piled iron core pieces being blanked from at least two piled sheet materials and sequentially laminated on other piled iron core pieces, wherein the piled iron core pieces adjacent in a direction of lamination are interlocked together by a plurality of caulking parts provided in each piled iron core pieces, wherein
each of the plurality of caulking parts includes a caulking protrusion formed in one side and a caulking fitting groove formed in the other side to which the caulking protrusion is fitted, and the caulking protrusion is allowed to protrude to the caulking fitting groove of the piled iron core pieces adjacent thereto in the direction of lamination,
both sides of a bottom part of the caulking protrusion in a direction of width are separated by a gap from inner surfaces of a body of the iron core piece which define an inner width of the caulking fitting groove, and
a width of the bottom part of the caulking protrusion is larger than the inner width of the caulking fitting groove.

2. The laminated iron core according to claim 1, wherein the caulking part has a V-shape.

3. The laminated iron core according to claim 2, wherein both sides of the caulking protrusion in a direction of length are connected to the body of the iron core piece.

4. The laminated iron core according to claim 2, wherein both sides of the bottom part of the caulking protrusion in a direction of length are connected to the body of the iron core piece via inclined parts.

5. The laminated iron core according to claim 1, wherein a protruding width of the caulking protrusion with respect to the caulking fitting groove in plan view is set within a range of 2% or higher and 6% or lower as thick as a thickness of one sheet material of the at least two piled sheet materials.

6. The laminated iron core according to claim 5, wherein the protruding width of the caulking protrusion is defined by the following expression:

$$(\text{the width of the caulking protrusion} - \text{the inner width of the caulking fitting groove})/2.$$

7. The laminated iron core according to claim 1, wherein a depth of the caulking fitting groove is two times or more as thick as a thickness of the one sheet material of the at least two piled sheet materials.

8. The laminated iron core according to claim 1, wherein each piled iron core pieces have at least two iron core pieces different in thickness, and a depth of the caulking fitting groove is two times or more as thick as an average thickness of the at least two piled sheet materials.

9. The laminated iron core according to claim 1, wherein a sheared surface and a broken surface are formed in a side surface of the iron core piece of the piled iron core pieces located in an upper side, and a broken surface is formed in a side surface of the iron core piece of the piled iron core pieces located in a lower side.

10. A method of manufacturing the laminated iron core according to claim 1, the manufacturing method comprising:

forming a plurality of caulking parts in at least two piled sheet materials; and blanking piled iron core pieces from the at least two piled sheet materials having the plurality of caulking parts formed and sequentially laminating the piled iron core pieces on other piled iron core pieces, wherein forming the plurality of caulking parts includes using a caulking part forming unit which has a die arranged to be fixed in a given position and a punch paired with the die, wherein an inner width of the die is larger than a width of the punch, to thereby form a caulking protrusion in one side of the piled sheet materials and a caulking fitting groove to which the caulking protrusion is fitted in the other side, wherein a width of the caulking protrusion is larger than an inner width of the caulking fitting groove.

11. The manufacturing method for the laminated iron core according to claim 10, wherein a clearance between the inner width of the die and the punch is set within a range of 2% or higher and 6% or lower as thick as a thickness of one sheet materials of the at least two piled sheet materials.

12. The manufacturing method for the laminated iron core according to claim 10, wherein a pressing operation is carried out by the punch until a depth of the caulking fitting groove is two times or more as thick as a thickness of the one sheet material of the at least two piled sheet materials.

13. The laminated iron core according to claim 1, wherein the gap is formed so as to increase a depth of the caulking fitting groove, wherein the depth of the caulking fitting groove is greater than a combined thickness of each of the piled iron core pieces.

\* \* \* \* \*

UNITED STATES PATENT AND TRADEMARK OFFICE
CERTIFICATE OF CORRECTION

PATENT NO. : 10,109,417 B2
APPLICATION NO. : 14/637753
DATED : October 23, 2018
INVENTOR(S) : I. Nakamura Page 1 of 1

It is certified that error appears in the above-identified patent and that said Letters Patent is hereby corrected as shown below:

In the Claims

At Column 11, Line 21 (Claim 11, Line 5), please change the first instance of "materials" to -- material --.

Signed and Sealed this
Eighteenth Day of June, 2019

Andrei Iancu
*Director of the United States Patent and Trademark Office*